United States Patent
Reusche et al.

(10) Patent No.: US 6,469,281 B1
(45) Date of Patent: Oct. 22, 2002

(54) HEATED WATERING BUCKET

(75) Inventors: Thomas K. Reusche, Elburn; Donald B. Owen, Batavia; Joe Blahnik, St. Charles, all of IL (US)

(73) Assignee: Allied Precision Industries, Inc., Elburn, IL (US)

( * ) Notice: Subject to any disclaimer, the term of this patent is extended or adjusted under 35 U.S.C. 154(b) by 0 days.

(21) Appl. No.: 09/834,079

(22) Filed: Apr. 12, 2001

(51) Int. Cl.⁷ .................................................. A01K 7/00
(52) U.S. Cl. ............................ 219/438; 219/429; 119/73
(58) Field of Search .................................. 219/429, 436, 219/438, 385, 386; 119/73

(56) References Cited

U.S. PATENT DOCUMENTS

| | | | |
|---|---|---|---|
| 3,820,508 A | * | 6/1974 | Robinson ..................... 119/73 |
| 3,949,707 A | | 4/1976 | Armstrong et al. |
| 3,968,348 A | * | 7/1976 | Stanfield ..................... 219/535 |
| 4,100,885 A | | 7/1978 | Kapplinger |
| 4,130,090 A | | 12/1978 | Bohlmann |
| 4,256,950 A | * | 3/1981 | Wildgruber ................. 119/73 |
| 4,440,112 A | | 4/1984 | Lilyerd |
| 4,561,384 A | * | 12/1985 | Liff ............................. 119/73 |
| 4,640,226 A | | 2/1987 | Liff |
| 4,744,332 A | | 5/1988 | Ahrens |
| 4,908,501 A | * | 3/1990 | Arnold, III ................ 219/438 |
| 4,953,507 A | | 9/1990 | Robinson |
| 5,140,134 A | | 8/1992 | Reusche et al. |
| 5,345,063 A | | 9/1994 | Reusche et al. |
| 5,990,455 A | | 11/1999 | Scott et al. |

* cited by examiner

Primary Examiner—Joseph Pelham
(74) Attorney, Agent, or Firm—McAndrews, Held & Malloy

(57) ABSTRACT

A heated water bucket includes a main bucket having a bottom wall and a wall extending upwardly from the bottom wall. The side wall has an upper portion, a lower portion and a downwardly extending lip formed at the junction of the inner and outer buckets. The outer bucket has a reduced height relative to the height of the main bucket and its side wall seats within a radial groove defined by the downwardly extending lip. A heating element in the form of a foil heater is disposed between the inner and outer buckets outer shell and the main bucket. The heating element is wrapped around the side wall of the inner bucket and may be secured thereto by an adhesive backing. A power cord extends from the watering tank and is interconnected with the heating element for delivering electrical power thereto.

16 Claims, 3 Drawing Sheets

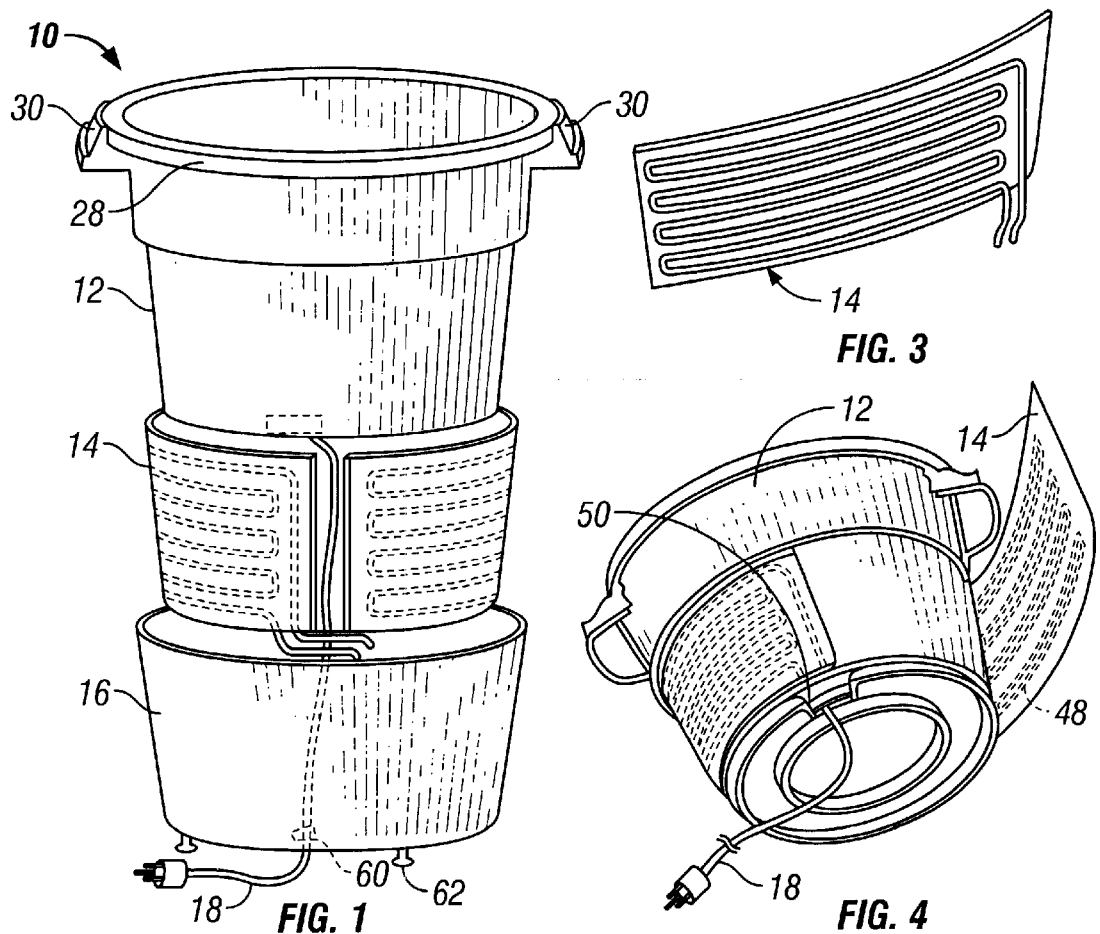
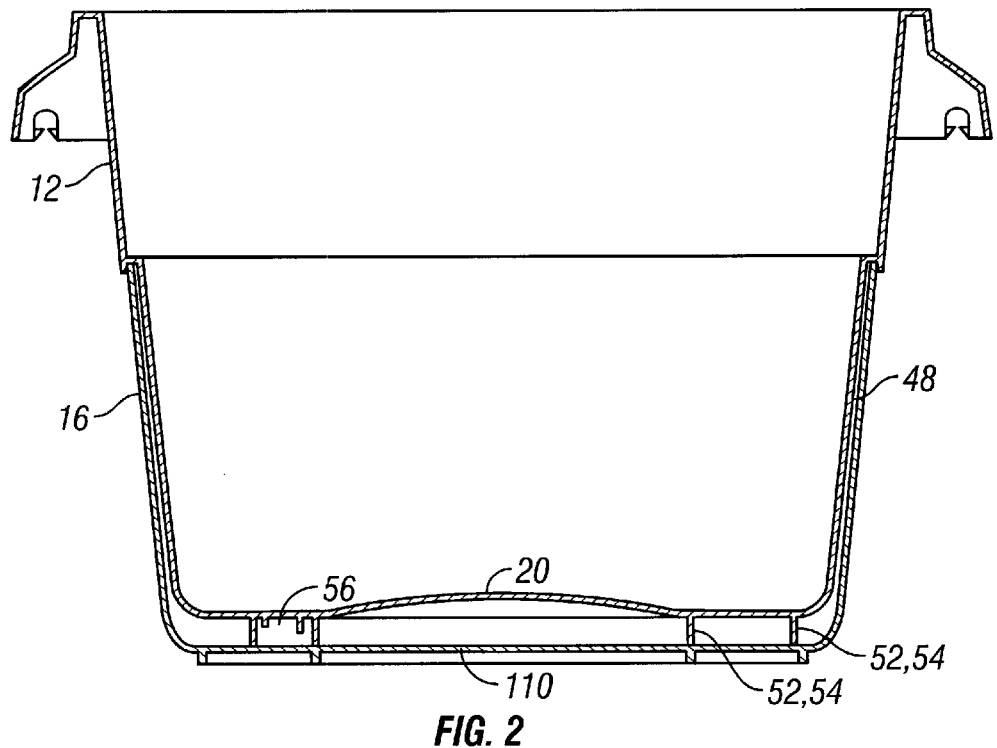

HEATED WATERING BUCKET

CROSS REFERENCE TO RELATED APPLICATIONS (if applicable)

Not applicable

STATEMENT REGARDING FEDERALLY SPONSORED RESEARCH & DEVELOPMENT (if applicable)

Not applicable

BACKGROUND OF THE INVENTION

The present invention relates generally to a heated water bucket designed to prevent liquids such as water from freezing when placed outside in cold weather.

Domestic animals, such as livestock and pets, require large amounts of water throughout the year. In order to provide domestic animal with needed water during winter months, it is known to equip exterior livestock watering tanks with heating elements to prevent the water contained therein from icing over during cold temperatures. Often the heating elements are in the form of immersable heater that either float in the tank or rest on the bottom of the tank. Although such immersable heaters may prevent the water from freezing, they tend to need to be replaced frequently. Alternatively, it is know to equip the watering tank with a built in heater. One known design, which is sold by the assignee of the present application, consists of a pair of gallon plastic buckets, which are nested one inside of the other. A heating element in the form of a foil heater is disposed between the walls of the two buckets. The heating element is affixed to the inner bucket by an adhesive. Because of its relatively small size, this bucket needs to be secured to prevent it from being tipped over by animals. Additionally, its small size necessitates frequent refilling when it is used by large animals, such as horses, and makes it unsuitable for supply water to multiple animals. Using this design for a larger bucket, such as a sixteen or twenty gallon bucket, would be relatively expensive because it would require using two of the larger, more costly buckets.

BRIEF SUMMARY OF THE INVENTION

A heated water bucket includes a main bucket having a bottom wall and a wall extending upwardly from the bottom wall. The side wall has an upper portion and a lower portion. An outer shell disposed about the lower portion of side wall of the main bucket. The outer shell and the side wall of the main bucket define a compartment therebetween. A heating element is disposed between the outer shell and the main bucket. A power cord extends from the watering tank and is interconnected with the heating element for delivering electrical power thereto.

The heating element may be a foil heater, which may be secured around lower portion of the side wall of the main bucket. The foil heater may include an adhesive backing which secures the foil heater to the side wall of the main bucket.

The outer shell may be formed by a second bucket having a reduced height relative to the height of the main bucket. The side wall of the main bucket may include a downwardly extending lip formed at the junction of its upper and lower portions, and the side wall of the second bucket may be configured to seat in the downwardly extending lip.

BRIEF DESCRIPTION OF THE DRAWINGS

FIG. 1 is an exploded perspective view of a heated water bucket formed in accordance with a preferred embodiment of the present invention.

FIG. 2 is a cross-sectional view of a heated water bucket formed in accordance with a preferred embodiment of the present invention.

FIG. 3 is an elevation view of the heating element formed in accordance with certain aspects of a preferred embodiment of the present invention.

FIG. 4 is a perspective view illustrating installation of a heating element onto a main bucket in accordance with certain aspects of -a preferred embodiment of the present invention

Figure 5A:
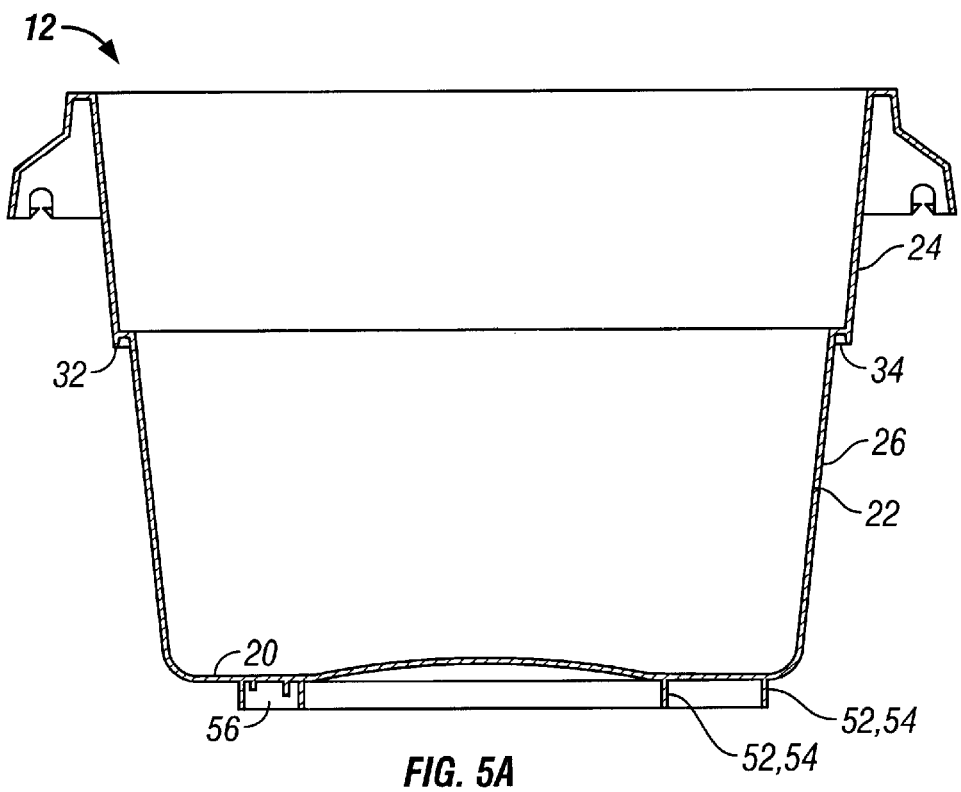
FIGS. 5A is a cross-sectional view of a main bucket formed in accordance with certain aspects of a preferred embodiment of the present invention.

The foregoing summary, as well as the following detailed description of the preferred embodiments of the invention, will be better understood when read in conjunction with the appended drawings. For the purpose of illustrating the invention, the drawings show embodiments which are presently preferred. It should be understood, however, that the present invention is not limited to the precise arrangements and instrumentality shown in the attached drawings.

DETAILED DESCRIPTION OF THE INVENTION

Referring now to the drawings, a heated water bucket 10 according to a preferred embodiment of the present invention, includes main or inner bucket 12, a heating element 14 positioned around the side wall of the main bucket, an outer shell 16 disposed around the heating element to seal the heating element against moisture, and a power cord 18 extending from water tank and being interconnected with the heating element 14 for delivering electrical power thereto.

In use, the main bucket 12 holds the water for the animals. As such, the bucket is preferably made a plastic such as polyethylene or polypropylene and may be formed by molding. The main bucket 12 has a bottom wall 20 and a circular side wall 22 extending upwardly from the bottom wall. The side wall 22 has an upper portion 24 and a reduced diameter lower portion 26. The diameters of the upper and lower portions may be constant, or they may gradually decrease from top to bottom (as shown) to form a tapered side wall. The top edge of the side wall 22 includes a smooth outwardly facing lip 28 to eliminate what would otherwise be a relatively sharp edge. A pair of opposed handles 30 are provided for use in moving the bucket. The side wall 22 presents a downwardly facing radial lip 32 at the junction of its upper and lower portions 24, 26. The lip 32 defines a radial groove 34 which is configured to receive the upper edge of the outer shell 16, as is explained in greater detail below.

Figure 6A:
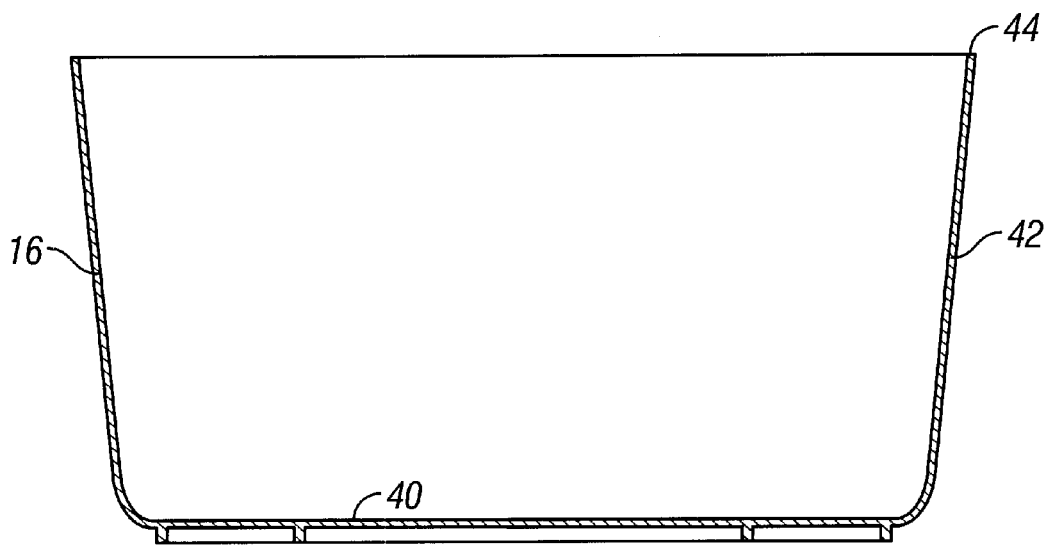
FIGS. 6A is a cross-sectional view of an outer shell formed in accordance with certain aspects of a preferred embodiment of the present invention.
Figure 6B:
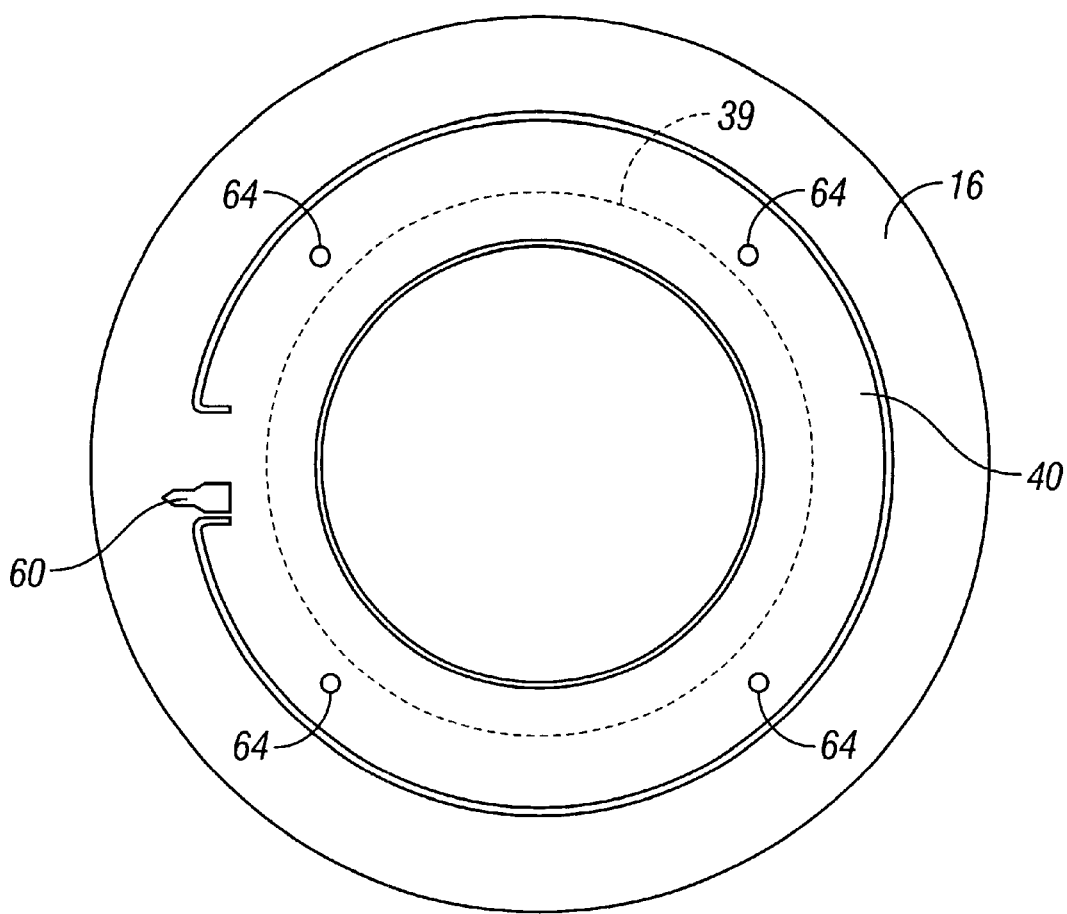
FIG. 6B is a bottom elevation view of the outer shell of FIG. 6A.

The outer shell 16 is preferably in the form of a second (or outer) bucket, which slides over the lower portion 26 of the main bucket 12. It should be appreciated, however, that additional material savings could be realized by forming the outer shell from a partial bucket, e.g. by eliminating part of the bottom wall 40 of the outer bucket, as is shown generally by the broken line 39 in FIG. 6B. The outer shell has bottom wall 40 and a circular side wall 42 extending upwardly from the bottom wall. The side wall 42 of the outer shell 16 is shorter than the side wall 22 of the inner bucket 12, and its upper edge 44 is configured to seat within the groove 34 of the downwardly extending lip 32 of the inner bucket. (See FIG. 2).

The heating element 14 is mounted in the gap 48 between the side walls 22, 42 of the inner and outer buckets 12, 16. The heating element 14 preferably consists foil heater which is formed by a heating coil sandwiched between two sheets of foil. The heating element 14 is particularly well suited for this application because it is relatively thin and provides even heat distribution. As can best be seen in FIG. 4, the heating element 14 is installed by wrapping it around the lower portion 26 of the side wall 22 of the inner bucket 12. The heating element 14 may be secured in place by adhesive. In this respect, the heating element 14 may include an adhesive backing 48 to secure it to the bucket 12. The heating element 14 extends along substantially the entire height of the side wall lower portion 26 of the side wall 22.

The heating element 14 is electrically connected to the power cord 18 through a thermostat 50 which automatically cuts off power to the heating element when the temperature exceeds a preset limit. The thermostat and its interconnection with the power cord and the heating element are encased in epoxy to seal against moisture and prevent electrical "shorts". It will be appreciated, that the thermostat could also be located within the foil heater, in which case it should be sleeved, e.g. in plastic, to prevent moisture infiltration.

Figure 5B:
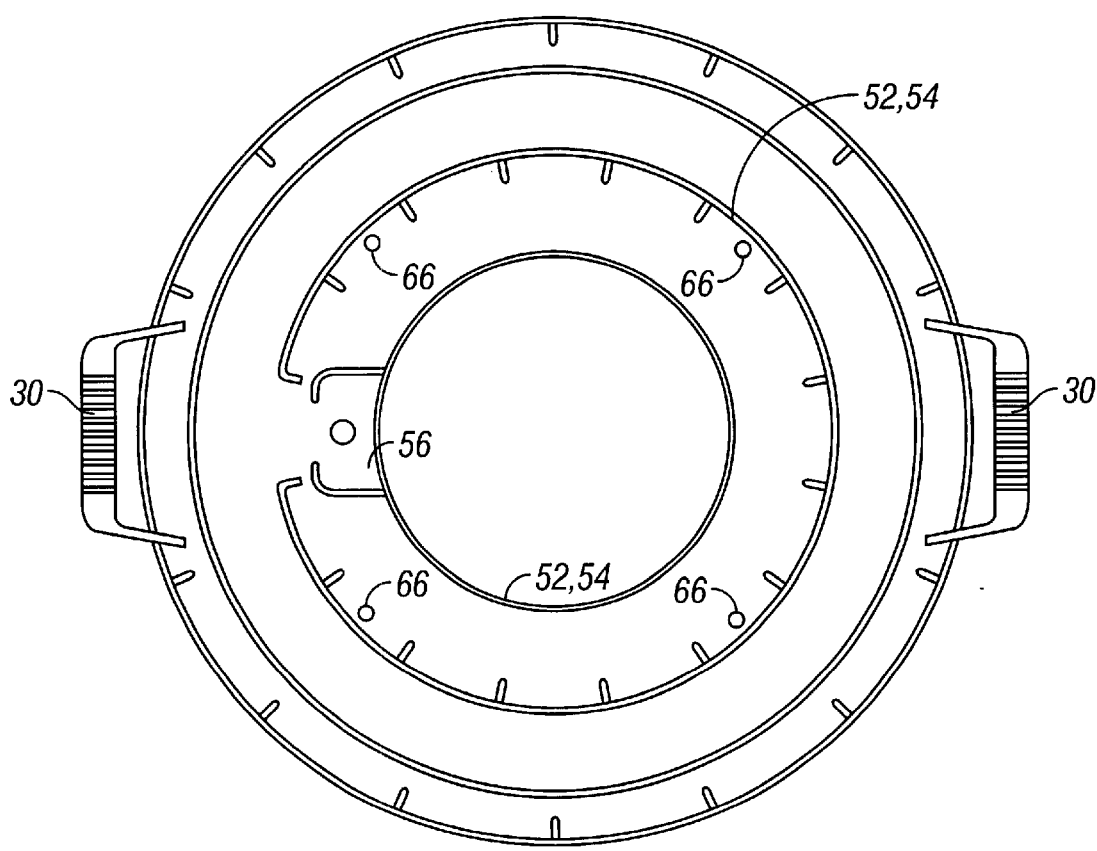
FIG. 5B is a bottom elevation view of the main bucket of FIG. 5A.

Referring to FIGS. 2, 5A and 5B, the inner bucket at least one support leg 52 extending downwardly from its bottom wall. The leg 52 engages against the bottom wall 40 of the outer bucket 16 so as to space the bottom wall 20 of the inner bucket 12 from the bottom wall 40 of the outer bucket 16 and to support the bottom wall 20 of the inner bucket 12 against downward deflection. Preferably the inner bucket 12 includes a pair of radial flanges 54 extending downwardly from the bottom wall 20 for this purpose. The bottom wall further defines a potting box 56 which houses the thermostat 50. Potting compound is injected into the box 50 during manufacture to seal the thermostat 50 against moisture. The power cord 18 extends from the potting box and out through a slot 60 or opening formed in the outer bucket 16.

The water bucket 10 is assembled in the following manner. First, the heating element 14 is wrapped around the lower portion 26 of the inner bucket 12. This is done by initially aligning the power end of the heating element with the potting box 56. As the heating element 14 is wrapped around the inner bucket 12, its adhesive backing secures it to the bucket. The thermostat 50 is then positioned in the potting box 56 and sealed with potting material. After the potting material has cured, the power cord 18 is routed through the slot 60 in the outer bucket 16 and the outer bucket 16 is slid into place over the lower portion 26 of the inner bucket 12. The upper edge of the outer bucket's side wall 42 seats within the lip 32 formed on the side wall 22 of the inner bucket. This interconnection seals against moisture infiltration and prevents the side walls 22, 42 from deflecting relative to one another. The inner and outer buckets 12, 16 are secured together by a plurality of threaded fasteners 62 which extend through holes 64 formed in the bottom wall 40 of the outer bucket and thread into bosses 66 which extend from the bottom wall 20 of the inner bucket. It will be appreciated that the buckets 12, 16 could be joined by other means such as adhesive or sonic welding.

A watering bucket constructed in accordance with the above described embodiment provides several advantages. First it simple design makes it easy and relatively inexpensive to manufacture. Because the heating element is sealed within the water tank, it is less susceptible to failure from wear than immersable heaters. Additionally, animals cannot pull the heating element out of the tank, as is possible with immersable heaters. The heating element cannot. Making the outer bucket shorter than the inner bucket results in significant cost and material savings in comparison to the prior design that used two identical buckets. This is particularly true for larger volume buckets, such as 16 gallon or 20 gallon capacity tanks.

What is claimed is:

1. A heated water bucket comprising:
    a main bucket having a bottom wall and a side wall extending upwardly from the bottom wall, the side wall having an upper portion and a lower portion;
    an outer shell disposed about the lower portion of side wall of the main bucket, the outer shell and the side wall of the main bucket defining a compartment therebetween, the outer shell comprises a bucket having a reduced height relative to the height of the main bucket;
    a heating element disposed between the outer shell and the main bucket; and
    a power cord extending from the watering tank and being interconnected with the heating element for delivering electrical power thereto.

2. A heated water bucket as set forth in claim 1, wherein the heating element comprises a foil heater.

3. A heated water bucket as set forth in claim 2, wherein the foil is secured to side of the main bucket.

4. A heated water bucket as set forth in claim 3, wherein the foil heater includes an adhesive backing which secures the foil heater to the side wall of the main bucket.

5. A heated water bucket comprising:
    a main bucket having a bottom wall and a side wall extending upwardly from the bottom wall, the side wall having an upper portion and a lower portion;
    an outer shell disposed about the lower portion of side wall of the main bucket, the outer shell and the side wall of the main bucket defining a compartment therebetween, the outer shell comprises a second bucket having a bottom wall and a side wall extending upwardly from the bottom wall, the side wall of the second bucket being shorter than the side wall of the main bucket;
    a heating element disposed between the outer shell and the main bucket; and
    a power cord extending from the watering tank and being interconnected with the heating element for delivering electrical power thereto.

6. A heated water bucket as set forth in claim 5, wherein side wall of the main bucket includes downwardly extending lip formed at the junction of the upper and lower portions, and wherein side wall of the second bucket has an upper edge which seats in the downwardly extending lip.

7. A heated water bucket as set forth in claim 1, wherein the outer shell is secured to the main bucket by a plurality of threaded fasteners.

8. A heated water bucket as set forth in claim 5, wherein the second bucket comprises a partial bucket having a partial bottom wall.

9. A heated water bucket comprising:
    an inner bucket having a bottom wall and a circular side wall extending upwardly from the bottom wall, the side wall having an upper portion, a reduced diameter lower portion and a downwardly extending lip formed at the junction of the upper and lower portions;

an outer bucket disposed about the main bucket, the outer bucket having bottom wall and a circular side wall extending upwardly from the bottom wall, the side wall of the outer bucket being shorter than the side wall of the inner bucket and having an upper edge seated in the downwardly extending lip of the inner bucket, the side walls of the inner and outer buckets defining a gap therebetween;

a heating element disposed in the gap between the inner and outer buckets; and a power cord extending from the watering tank and being interconnected with the heating element for delivering electrical power thereto.

10. A heated water bucket as set forth in claim 9, wherein the heating element comprises a foil heater.

11. A heated water bucket as set forth in claim 10, wherein the foil is secured to side wall of the inner bucket.

12. A heated water bucket as set forth in claim 11, wherein the foil heater includes an adhesive backing which secures the foil heater to the side wall of the inner bucket.

13. A heated water bucket as set forth in claim 9, wherein the outer bucket is secured to the inner bucket by a plurality of threaded fasteners.

14. A heated water bucket as set forth in claim 9, wherein the main bucket includes at least one leg extending downwardly from its bottom wall, the leg engaging against the bottom wall of the outer bucket so as to space the bottom wall of the inner bucket from the bottom wall of the outer bucket and to support the bottom wall of the inner bucket against downward deflection.

15. A heated water bucket as set forth in claim 9, wherein the bottom wall of the second bucket has an open center.

16. A heated water bucket comprising:

an inner bucket having a bottom wall and a circular side wall extending upwardly from the bottom wall, the side wall having an upper portion, a reduced diameter lower portion and a downwardly extending lip formed at the junction of the upper and lower portions;

an outer bucket disposed about the main bucket, the outer bucket having bottom wall and a circular side wall extending upwardly from the bottom wall, the side wall of the outer bucket being shorter than the side wall of the inner bucket and having an upper edge seated in the downwardly extending lip of the inner bucket, the side walls of the inner and outer buckets defining a gap therebetween;

a heating element positioned in the gap between side walls of the inner and outer bucket and being secured about the lower portion of the side wall of the main bucket; and a power cord extending from the watering tank and being interconnected with the heating element for delivering electrical power thereto.

* * * * *